Oct. 22, 1968     D. J. ROMINE     3,407,326
SPARK PLUG HAVING A COMPOSITE GOLD OR GOLD ALLOY ELECTRODE
AND A PROCESS FOR ITS MANUFACTURE

Filed March 14, 1967     3 Sheets-Sheet 1

DONALD J. ROMINE
INVENTOR.

BY *John R. Faulkner*
*Glenn S. Arendsen*

ATTORNEYS 3,407,326
SPARK PLUG HAVING A COMPOSITE GOLD OR GOLD ALLOY ELECTRODE AND A PROCESS FOR ITS MANUFACTURE
Donald J. Romine, Taylor, Mich., assignor to Ford Motor Company, Dearborn, Mich., a corporation of Delaware
Filed Mar. 14, 1967, Ser. No. 623,056
15 Claims. (Cl. 313—141)

ABSTRACT OF THE DISCLOSURE

This disclosure describes a composite electrode for a spark plug comprising a gold or gold alloy tip thermally and electrically attached to a base metal body. The tip is located at one end of the sparking gap and the composite electrode is electrically negative with respect to the electrode at the other end of the sparking gap. Resulting is a spark plug having very little erosion and, consequently, a long life. An annular sleeve of corrosion resistant material surrounding a core of high thermal and electrical conductivity can be used to make up the electrode body. The tip can be in the form of an insert surrounded on three sides by the body.

---

A process for producing good thermal and electrical attachments between the tip and the body by abutting the tip with the body and alloying the junction between tip and body also is described. Abutting is achieved by placing tip and body in intimate contact by expanding the tip into the sleeve, for example, and alloying is carried out by heating to a predetermined temperature. Abutting and alloying can be carried out in the same operation by dipping the body in a molten bath of the tip material or by pouring molten body metal into a mold containing a tip.

Summary of the invention

Erosion of spark plug electrodes eventually increases the sparking gap to such an extent that extremely high voltages are required across the electrodes. These high voltages further increase the erosion rate in addition to putting a strain on the other components of the ignition system. Partially because of the erosion, presently available spark plugs seldom have useful lives exceeding 15,000 to 20,000 miles of vehicle operation.

Gold has been proposed as a spark plug electrode material in the past but has failed to attain any commercial acceptance because of its high cost and a fear that its low melting point would result in early failure, especially in modern high performance engines. Moreover, it was believed that both electrodes had to be made of gold to realize its noble nature.

This invention provides an electrode construction using small amounts of gold in a manner that keeps the cost increase to a minimum and reduces the melting tendency of the gold or gold alloy while doubling and even tripling the life of the spark plug. The spark plus has a positive electrode with a negative electrode spaced therefrom across a sparking gap. The negative electrode comprises an electrode body and a tip comprising gold electrically and thermally attached to the body at one end of the sparking gap.

Detailed description

Figure 1:
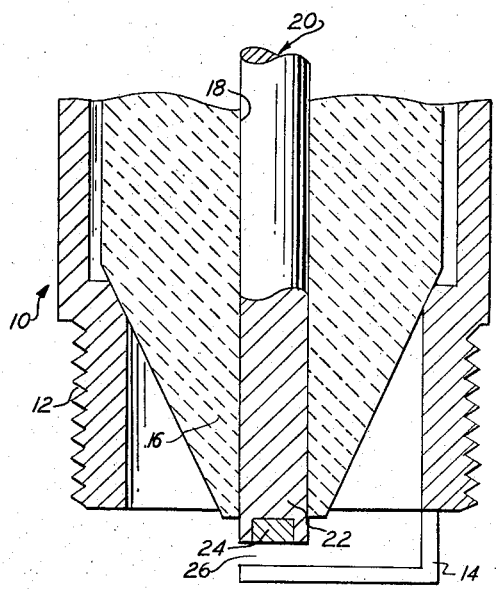
FIGURE 1 is a sectional view of the end of a spark plug showing a composite electrode comprising a gold or gold alloy insert surrounded on three sides by a base metal body. The electrode body projects a short distance from the end of the insulator into the combustion chamber.

In FIGURE 1 a spark plug shell 10 has threads 12 at one end for attachment to the engine. The positive electrode 14 is attached to the threaded end and is bent across the middle of the opening in shell 10. A ceramic insulator 16 is positioned in shell 10 and has a longitudinal passage 18 opening at the lower end adjacent electrode 14.

A negative electrode indicated generally by the numeral 20 comprises a body 22 and a tip in the form of an insert 24. Body 22 is located in passage 18 so insert 24 is separated from electrode 14 by a sparking gap 26. Body 22 is made from corrosion resistant metals and alloys such as the nickel-chromium-iron alloys sold under the trademark "Inconel," other high nickel alloys, silver, copper, etc. Insert 24 is gold, or gold alloyed with palladium, platinum, iron, nickel, chromium, tungsten, molybdenum, etc., and is thermally and electrically attached to body 22. Gold alloyed with platinum or palladium is preferred because these alloys form an unbroken series of solid solutions.

Ignition voltage applied between shell 10 and electrode 20 produces an ignition spark that crosses gap 26 between insert 24 and electrode 14. Heat produced in the combustion process is transmitted through electrode body 22 into insulator 16 which eventually dissipates the heat through shell 10 in a conventional manner.

Figure 2:
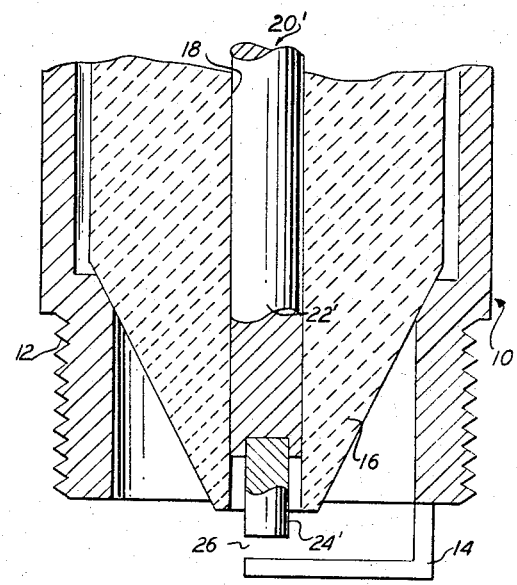
FIGURE 2 shows an alternate construction in which the gold or gold alloy tip projects from the end of the electrode body and the end of the insulator into the combustion chamber.

In FIGURE 2 electrode 20 is replaced by an electrode 20' comprising a body 22' that terminates a short distance from the end of insulator 16. The gold or gold alloy tip 24' attaches thermally and electrically to body 22' within passage 18 at one end with its other end projecting out of the end of insulator 16. Again, tip 24' terminates across the sparking gap 26 from electrode 14. The FIGURE 2 construction protects the bond between tip 24' and body 22' from the corrosive combustion atmosphere to a greater degree than the FIGURE 1 construction and thereby allows the use of less expensive materials in body 22'.

Figure 3:
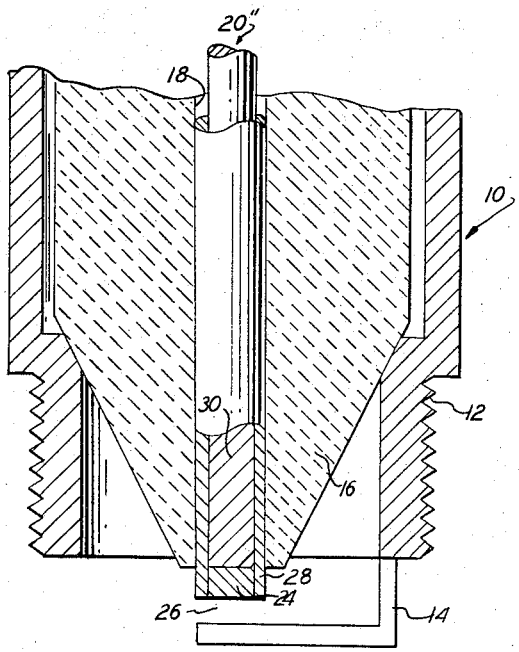
FIGURE 3 shows a gold or gold alloy insert in the end of an electrode body made up of an annular sleeve of heat and corrosion resistant material surrounding a core of a material having a high thermal and electrical conductivity.

The FIGURE 3 construction is similar to the FIGURE 1 construction except that electrode 20″ comprises an annular sleeve 28 positioned in passage 18 and surrounding a core 30. Sleeve 28 projects from the end of insulator 16 while core 30 terminates a short distance from the end of sleeve 28. Insert 24 is positioned in the end of sleeve 28.

Sleeve 28 is a highly corrosion resistant material such as "Inconel," while core 30 is a material having a high thermal and electrical conductivity such as copper or silver. It is important in the FIGURE 3 construction that insert 24 be electrically and thermally attached to core 30. High electrical and thermal conductivity between insert 24 and sleeve 28 also is useful, and a good seal should be maintained between insert 24 and sleeve 28 to prevent the corrosive combustion products from reaching core 30 and the bond between insert 24 and core 30.

Spark plugs having the FIGURE 3 structure provide lower operating temperatures for insert 24 because of the good heat path through core 30. In addition, sleeve 28 can be made of materials in which corrosion resistance is the primary property instead of compromising corrosion resistance with heat conductivity.

Excellent thermal and electrical attachment of the tip with the body of the electrode can be attained by a process comprising abutting the tip in intimate contact with the body and alloying the junction between the tip and the body.

The abutting step of this process is carried out by placing the tip in contact with the body without an intermediate oxide coating. Working in a nonoxidizing atmosphere prevents formation of such coatings. A useful method comprises expanding the insert material into a hole in the body by tamping to produce cold deformation of the tip material.

Alloying is achieved then by heating the abutted tip and body to a temperature sufficient to form an alloy of the body material and the tip material at the junction. When nickel-chromium-iron alloys sold under the trademark Inconel are used as the body material and fine gold is used as the tip material, holding a temperature of about 965° C. for 15 minutes produces an alloyed junction having good thermal and electrical conductivity. Heating preferably is carried out in a nonoxidizing atmosphere also.

Both abutting and alloying can be carried out in the same operation by dipping the body into a bath of molten metal capable of solidifying into a tip. Preheating the body prior to the dip may be necessary along with providing a path for removing heat from one end of the body while the other end is in the bath. Again a nonoxidizing atmosphere is preferable. Where the desired tip composition is fine gold, a bath of fine gold is used. Tips of gold alloy sometimes require baths having compositions slightly different from the desired tip composition because of preferential solidification.

An alternate process in which abutting and alloying is carried out in the same operation comprises melting body metal in a mold containing the tip and maintaining the temperature of the body metal and the tip until alloying occurrs. This alternate process produces excellent results in the manufacture of fine wire spark plugs comprising silver or other expensive electrode body materials. In carrying out the process, a spark plug insulator similar to insulator 16 but having insulating material filling the space around tip 24' in FIGURE 2 can be used as the mold. A tip having a head at one end is fitted in the passage through the insulator so the head seats on a shoulder near the lower end of the passage and the tip extends out of the insulator.

A wire of the body metal is placed in the passage above the tip and the insulator is fired at a temperature exceeding the melting point of the body metal but less than the melting point of the tip until alloying occurs. A wire of a third material can be positioned in the upper portion of the passage in contact with the body metal to provide a good electrical connection.

Figure 4:
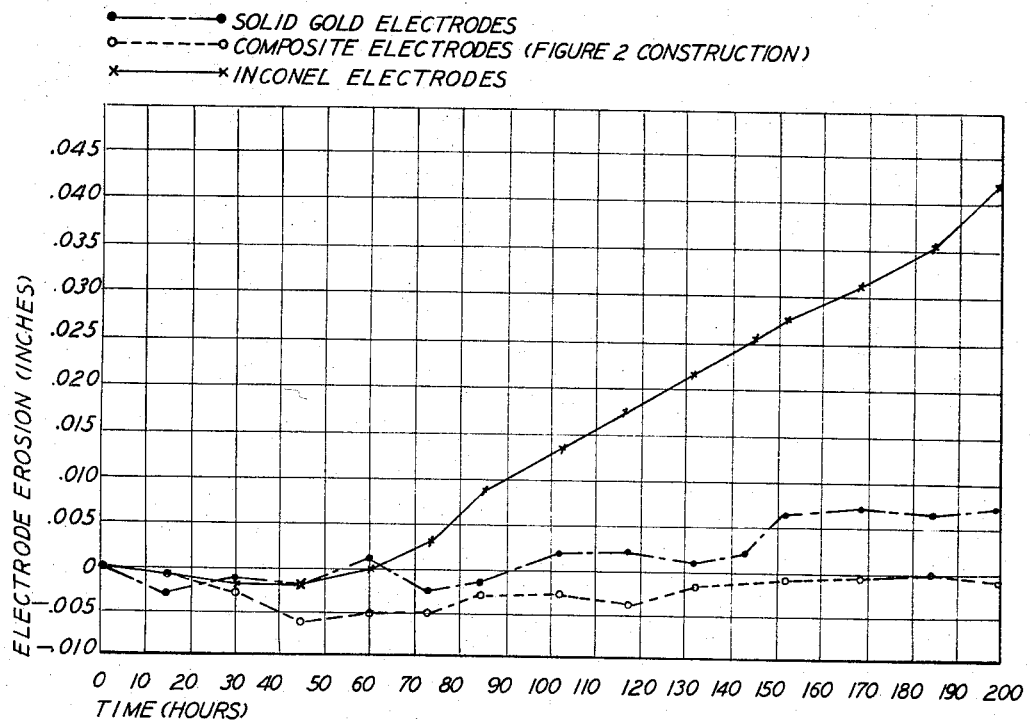
FIGURE 4 is a graph of electrode erosion data obtained from tests of electrodes of conventional Inconel, solid gold and composite gold. Spark plugs containing the electrodes were operated for 200 hours in an engine running at 3200 r.p.m.
Figure 5A:
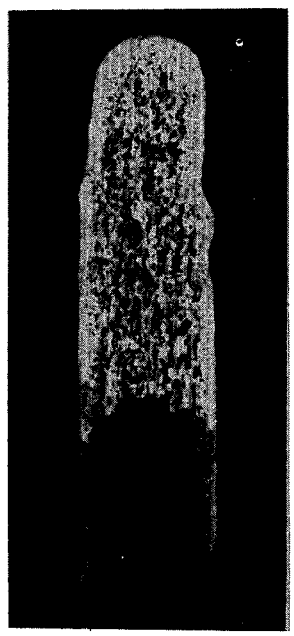
FIGURES 5A and 5B show the Inconel, 5C shows the solid gold and 5D shows a composite having a projecting gold tip of the FIGURE 2 construction. Magnification is 12×.
Figure 5B:
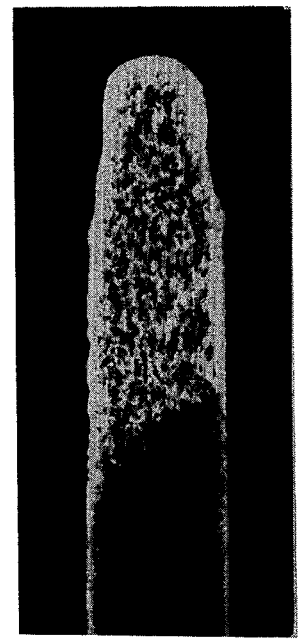
Figure 5C:
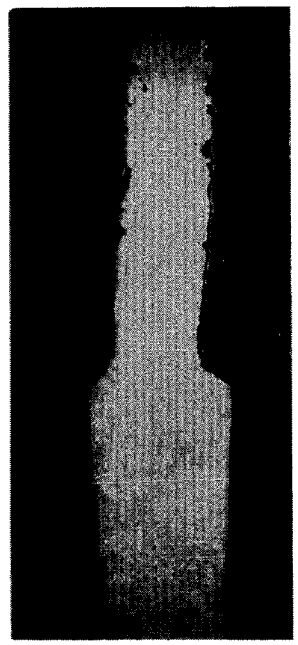
FIGURE 5 contains photomicrographs of Inconel, solid gold and composite electrodes after 200 hours in an engine running at 3200 r.p.m.
Figure 5D:
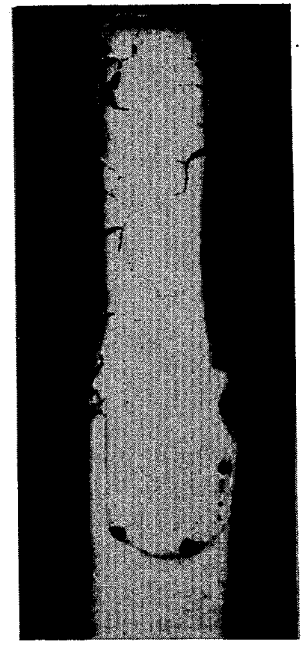

As shown in FIGURE 4, composite gold electrodes had nil erosion after 200 hours of operation in an engine running at 3200 r.p.m. while the Inconel electrodes eroded over 0.040 inch and the solid gold electrodes had negligible erosion of about 0.005 inch. Sparking gaps for each electrode were set at 0.030 inch at the beginning of the test, so that erosion of the Inconel electrodes doubled the sparking gap after about 164 hours. Clearly the composite gold electrodes avoid imposing the tremendous strain on the ignition system resulting from the erosion of Inconel electrodes.

The erosion of conventional Inconel electrodes is even more detrimental than indicated by the data of FIGURE 4 because of the rounding effect such erosion has on the corners of the electrodes. Sharp electrode corners aid ionization of the gases in the sparking gap and thereby depress the voltage required to produce a spark. As shown in FIGURE 5, erosion rounds the corners of the Inconel electrodes severely (FIGURES 5A and 5B) while the corners of the solid and composite gold electrodes retain most of their sharpness.

The discharge occurring between the electrodes of a spark plug is generally thought of as taking the form of a damped series of electrical oscillations in which each electrode is alternately positive and negative. However close studies of this discharge have shown that the bulk of the energy dissipated in the spark gap is spent in an initial huge current surge which dwarfs the following damped oscillations. This surge has a definite polarity and the term "negative electrode" as used in this specification refers to the electrode that is negative during this initial heavy surge of current.

Thus this invention provides a spark plug having a composite electrode made of a tip comprising a minimum amount of gold or gold alloy thermally and electrically attached to a base metal body and capable of preventing a significant increase in the length of the sparking gap when operated in an internal combustion engine for at least 200 hours at a moderate engine speed of between 2000 and 3500 r.p.m. The small amount of gold coupled with the fact that the gold is necessary only in the electrically negative electrode keeps the cost of the spark plug low while providing extremely long life. Gold alloyed with palladium in approximately equal amounts by weight produces a tip having a higher melting point than pure gold while retaining the erosion properties thereof and therefore has an even longer life. Processes for alloying the junction between the tip and the body of the electrode to make excellent thermal and electrical attachments between the tip and the body also are provided.

What is claimed is:

1. In a spark plug having a positive electrode and a negative electrode spaced from the positive electrode by a sparking gap of predetermined length, said positive electrode being made of a base metal and said negative electrode comprising:
   an electrode body, and
   a tip electrically and thermally attached to said body at one end of the sparking gap, said tip comprising sufficient gold to prevent a significant increase in the length of said sparking gap when operated in an internal combustion engine for at least 200 hours at a moderate engine speed.

2. The spark plug of claim 1 in which the electrode body consists essentially of silver, copper or high nickel alloys.

3. The spark plug of claim 2 in which the tip consists essentially of gold or alloys of gold with palladium.

4. The spark plug of claim 3 in which the electrode body is mounted in a ceramic insulator and projects a short distance from the insulator.

5. The spark plug of claim 4 in which the electrode body comprises an annular sleeve surrounding a core, said core having a high coefficient of thermal conductivity.

6. The spark plug of claim 5 in which the tip is located in the end of the sleeve.

7. The spark plug of claim 1 in which the tip is an insert opening on the sparking gap and surrounded on its remaining sides by the body.

8. The spark plug of claim 1 in which the electrode body is mounted in a ceramic insulator and terminates a short distance from the end of the insulator, said tip projecting out of the insulator.

9. In a process for manufacturing the spark plug of claim 1, the steps comprising:
   abutting the tip in intimate contact with the electrode body, and
   alloying the junction between the tip and the body.

10. The process of claim 9 in which alloying the junction comprises heating the abutted tip and body in a nonoxidizing atmosphere and maintaining the heat until alloying has occurred.

11. The process of claim 10 in which the tip consists essentially of gold or alloys of gold with palladium.

12. The process of claim 11 in which the body consists essentially of silver, copper, or high nickel alloys.

13. The process of claim 9 in which abutting the tip with the body comprises dipping the body into molten material capable of producing a tip.

14. The process of claim 9 in which abutting the tip with the body comprises melting body metal in a mold containing said tip and maintaining the temperature of the body metal until alloying occurs.

15. A spark plug comprising a pair of spaced electrodes which are separated by a sparking gap of predetermined length, one of said electrodes at its arcing surface being provided with an aurous tip, the other electrode being made of a base metal, said aurous tip being sufficiently massive and being in sufficiently intimate thermal contact with the remainder of the electrode to prevent any significant erosion of the aurous tip when such aurous tip serves as the negative electrode during the initial current surge.

References Cited

UNITED STATES PATENTS

| | | | |
|---|---|---|---|
| 1,296,938 | 3/1919 | Fahrenwald | 313—141 |
| 1,515,866 | 11/1924 | Marten | 313—141 |
| 2,171,249 | 8/1939 | Wiegand | 313—311 X |
| 2,296,033 | 9/1942 | Heller | 313—141 X |
| 2,391,458 | 12/1945 | Hensel | 313—141 X |
| 2,831,138 | 4/1958 | Teasel | 313—141 X |

JAMES W. LAWRENCE, *Primary Examiner.*

C. R. CAMPBELL, *Assistant Examiner.*